(12) United States Patent
Gao et al.

(10) Patent No.: US 9,948,562 B2
(45) Date of Patent: Apr. 17, 2018

(54) METHOD AND DEVICE FOR TRANSMITTING PILOT SIGNAL

(71) Applicant: China Academy of Telecommunications Technology, Beijing (CN)

(72) Inventors: Qiubin Gao, Beijing (CN); Wenhong Chen, Beijing (CN); Rui Zhao, Beijing (CN); Ying Peng, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 27 days.

(21) Appl. No.: 14/786,440

(22) PCT Filed: Apr. 22, 2014

(86) PCT No.: PCT/CN2014/075967
§ 371 (c)(1),
(2) Date: Oct. 22, 2015

(87) PCT Pub. No.: WO2014/173292
PCT Pub. Date: Oct. 30, 2014

(65) Prior Publication Data
US 2016/0072712 A1 Mar. 10, 2016

(30) Foreign Application Priority Data
Apr. 23, 2013 (CN) .......................... 2013 1 0144364

(51) Int. Cl.
*H04L 12/801* (2013.01)
*H04L 5/00* (2006.01)
(Continued)

(52) U.S. Cl.
CPC ............ *H04L 47/12* (2013.01); *H04L 5/0007* (2013.01); *H04L 5/0023* (2013.01);
(Continued)

(58) Field of Classification Search
CPC ...................................................... H04L 47/12
See application file for complete search history.

(56) References Cited

U.S. PATENT DOCUMENTS

2008/0165879 A1* 7/2008 Mehta ................. H04B 7/0691
375/267

FOREIGN PATENT DOCUMENTS

CN 101005472 7/2007
CN 101166166 A 4/2008
(Continued)

OTHER PUBLICATIONS

Alcatel-Lucent: "TDD/FDD E-UTRA commonality aspects of the reduced-latency DL reference signal for FDD E-UTRA" 3GPP Draft; RI-070122 Alcatel-Lucent TDD FDD EUTRA Commonality Aspects for DL RS, 3rd Generation Partnership Project (3GPP), Mobile Competence Centre; 650, Route Des Lucioles ; F-06921 Sophia-Antipolis Cedex ; France, vol. RAN WG1, no. Sorrento, Italy; Jan. 9, 2007, Jan. 9, 2007 (Jan. 9, 2007), XP050104169, [retrieved on Jan. 9, 2007].
(Continued)

*Primary Examiner* — John Blanton
(74) *Attorney, Agent, or Firm* — Foley & Lardner LLP

(57) ABSTRACT

Disclosed are a method and device for transmitting a pilot signal. The method therefor comprises: conducting OFDM modulation on a pilot signal; and sending the modulated pilot signal on the first and/or the last OFDM symbol of a subframe which transmits the pilot signal. In the technical solution provided in the embodiments of the present application, the pilot signal is transmitted on the first and/or the last OFDM symbol of the subframe, thereby not occupying an OFDM symbol for transmitting a data signal, so as to reduce the resource overhead of the pilot signal.

14 Claims, 6 Drawing Sheets

(51) Int. Cl.
*H04L 25/02* (2006.01)
*H04L 27/26* (2006.01)
*H04L 5/14* (2006.01)

(52) U.S. Cl.
CPC .......... *H04L 5/0048* (2013.01); *H04L 5/0051* (2013.01); *H04L 5/14* (2013.01); *H04L 25/0226* (2013.01); *H04L 27/2613* (2013.01); *H04L 5/0062* (2013.01); *H04L 5/0089* (2013.01)

(56) References Cited

FOREIGN PATENT DOCUMENTS

| CN | 101179317 | 5/2008 |
|---|---|---|
| CN | 101197804 A | 6/2008 |
| CN | 102916920 | 2/2013 |

OTHER PUBLICATIONS

Samsung: "Downlink time-frequency diversity transmission", 3GPP Draft; RI-051043-Samsung-DL Diversity Transmission, 3rd Generation Partnership Project (3GPP), Mobile Competence Centre; 650, Route Des Lucioles ; F-06921 Sophia-Antipolis Cedex ; France, vol. RAN WG1, no. San Diego, USA; Oct. 4, 2005, Oct. 4, 2005 (Oct. 4, 2005), XP050100665, [retrieved on Oct. 4, 2005].

LG Electronics Inc: "Resource Usage Optimization in the Backhaul Design", 3GPP Draft; RI-094480 UL Guard Time Final, 3rd Generation Partnership Project (3GPP), Mobile Competence Centre ; 650, Route Des Lucioles ; F-06921 Sophia-Antipolis Cedex ; France, no. Jeju; Nov. 9, 2009, Nov. 9, 2009 (Nov. 9, 2009), XP050388902, [retrieved on Nov. 2, 2009].

NEC Group: "Physical channel mapping for uni-cast", 3GPP Draft; RI-060056, 3rd Generation Partnership Project (3GPP), Mobile Competence Centre ; 650, Route Des Lucioles ; F-06921 Sophia-Antipolis Cedex ; France, vol. RAN WG1, no. Helsinki, Finland; Jan. 23, 2006, Jan. 19, 2006 (Jan. 19, 2006), XP050417439, [retrieved on Jan. 19, 2006].

Yaobin Wen et al: "A Novel Postfix Synchronization Method for OFDM Systems", IEEE International Symposium on Personal, Indoor and Mobile Radio Communications. PIMRC, IEE E; PI , XX, Sep. 1, 2007 (Sep. 1, 2007), pp. 1-5, XP031168134, ISBN: 978-1-4244-1143-6.

International Search Report for PCT/CN2014/075967 dated Jun. 24, 2014.

* cited by examiner

METHOD AND DEVICE FOR TRANSMITTING PILOT SIGNAL

This application is a US National Stage of International Application No. PCT/CN2014/075967, filed Apr. 22, 2014, designating the United States, and claiming the benefit of Chinese Patent Application No. 201310144364.2, filed with the State Intellectual Property Office of People's Republic of China on Apr. 23, 2013 and entitled "Method and device for transmitting pilot signal", the content of which is hereby incorporated by reference in its entirety.

FIELD

The present invention relates to the field of communications and particularly to a method and device for transmitting a pilot signal.

BACKGROUND

In the traditional cellular communication technologies, voice, data and other traffic between two UEs are exchanged through base stations where they reside, and a core network.

Device to Device (D2D), which is a direct communication technology, refers to that data can be transmitted between adjacent UEs in a short-distance range over a direct link without being forwarded by a central node (i.e., base station).

The Long Term Evolution (LTE) D2D technology refers to D2D communication controlled by an LTE network in an LTE licensed frequency band. The LTE D2D characteristic has been introduced to enable the LTE technology to evolve from the simple radio mobile cellular communication technology toward the universal connectivity technology.

If D2D communication is introduced to the LTE licensed frequency band, then radio resources will be shared by the D2D communication link and cellular communication, which is also a fundamental issue in integrating the D2D communication technology into the cellular system.

The radio resource can be multiplexed for sharing. Take the uplink radio resources in an LTE Frequency Division Duplex (FDD) system being multiplexed as an example, a receiver of D2D communication will receive a radio signal in a sub-frame allocated for D2D communication (simply a D2D sub-frame); and the receiver of D2D communication may still need to transmit a cellular radio signal in a sub-frame adjacent to the sub-frame (the sub-frame in which the cellular radio signal can be transmitted referred to as a cellular communication sub-frame).

If radio resources in the LTE FDD system are multiplexed for D2D communication, then an LTE uplink or downlink pilot structure may be used in a D2D sub-frame.

The fourth Orthogonal Frequency Division Multiplex (OFDM) symbol in each time slot is occupied by a demodulation pilot signal transmitted in the uplink in the LTE system. For a normal Cyclic Prefix (CP), the fourth OFDM symbol and the eleventh OFDM symbol in one sub-frame are pilot symbols; and for an extended CP, the fourth OFDM symbol and the tenth OFDM symbol in one sub-frame are pilot symbols.

For a normal CP, six Resource Elements (REs) in each of the last two OFDM symbols in each time slot are occupied by an LTE downlink demodulation pilot signal.

If the resources in the LTE FDD system are multiplexed for D2D communication, then there will be a significant overhead of resources for the pilot signal in either the LTE uplink or downlink pilot structure.

SUMMARY

An object of the invention is to provide a method and device for transmitting a pilot signal so as to address the problem of a significant overhead of resources for a pilot signal if resources in an LTE FDD system are multiplexed for D2D communication.

The object of the invention is attained by the following technical solutions:

A method for transmitting a pilot signal includes:
performing orthogonal frequency division multiplex modulation on the pilot signal; and
transmitting the modulated pilot signal in a first and/or last orthogonal frequency division multiplex symbol of a sub-frame in which the pilot signal is transmitted.

A method for receiving a pilot signal includes:
receiving the modulated pilot signal in a first and/or last orthogonal frequency division multiplex symbol of a sub-frame in which the pilot signal is transmitted; and
performing orthogonal frequency division multiplex demodulation on the modulated pilot signal to obtain the pilot signal.

A pilot signal transmitter includes:
a pilot signal modulating module configured to perform orthogonal frequency division multiplex modulation on a pilot signal; and
a pilot signal transmitting module configured to transmit the modulated pilot signal in a first and/or last orthogonal frequency division multiplex symbol of a sub-frame in which the pilot signal is transmitted.

A pilot signal receiver includes:
a pilot signal receiving module configured to receive a modulated pilot signal in a first and/or last orthogonal frequency division multiplex symbol of a sub-frame in which the pilot signal is transmitted; and
a pilot signal demodulating module configured to perform orthogonal frequency division multiplex demodulation on the modulated pilot signal to obtain the pilot signal.

The inventors have identified during making of the invention that if resources in an LTE FDD system are multiplexed for D2D communication, then transmitting and receiving may need to be switched between a D2D sub-frame and an adjacent cellular communication sub-frame, so no data signal can be transmitted in the first and last OFDM symbols in the D2D sub-frame, but data signal will be transmitted in the other OFDM symbols than the first and last OFDM symbol. Thus in the technical solutions according to the embodiments of the invention, a pilot signal will be transmitted in the first and/or last OFDM symbol in the sub-frame without occupying any OFDM symbol in which a data signal is transmitted, to thereby lower an overhead of resources for the pilot signal.

DETAILED DESCRIPTION OF THE EMBODIMENTS

If resources in an LTE FDD (or Time Division Duplex (TDD)) system are multiplexed for D2D communication, then transmitting and receiving may need to be switched between a D2D sub-frame and an adjacent cellular communication sub-frame. For example, if uplink resources in the LTE FDD system are multiplexed for D2D communication, then a transmitter of D2D communication needs to be switched from receiving to transmitting, between a D2D sub-frame and a preceding cellular communication sub-frame adjacent thereto. If downlink resources in the LTE FDD system are reused for D2D communication, then a receiver of D2D communication needs to be switched from transmitting to receiving, between a D2D sub-frame and a preceding cellular communication sub-frame adjacent thereto. Moreover if resources in the LTE FDD system are reused for D2D communication, then a D2D communication UE may receive data in preceding one of adjacent D2D sub-frames and transmit data in the succeeding D2D sub-frame, so the D2D communication UE also need to be switched between transmitting and receiving, between these two adjacent D2D sub-frames. In embodiments of the invention, both switching from receiving to transmitting and switching from transmitting to receiving will be referred to switching between transmitting and receiving.

It may take approximately 20 μs for switching between transmitting and receiving, which is more than the length of the longest CP defined in the existing communication protocol and doesn't meet the requirement for transmitting a data signal, thus no data signal can be transmitted in a first OFDM symbol and a last OFDM symbol in a D2D sub-frame. However since a pilot signal is transmitted on less time-frequency resources, the pilot signal can be transmitted in the first and last OFDM symbols. The embodiments of the invention provide a solution to transmitting a pilot signal. In this solution, a pilot signal is transmitted in a first and/or a last OFDM symbol of a sub-frame without occupying any OFDM symbol in which a data signal is transmitted, to thereby lower an overhead of resources for the pilot signal.

The technical solution according to the embodiments of the invention is particularly applicable to transmission of a pilot signal in a D2D sub-frame for which resources in an FDD system are multiplexed, but the technical solutions according to the embodiments of the invention will not be limited to the application to transmission of a pilot signal in a D2D sub-frame for which resources in an FDD system are multiplexed but can also be applicable to transmission of a pilot signal in another FDD sub-frame, or in a D2D sub-frame for which resources in a TDD system are multiplexed.

The technical solution according to the embodiments of the invention will be described below in details with reference to the drawings.

Figure 1:
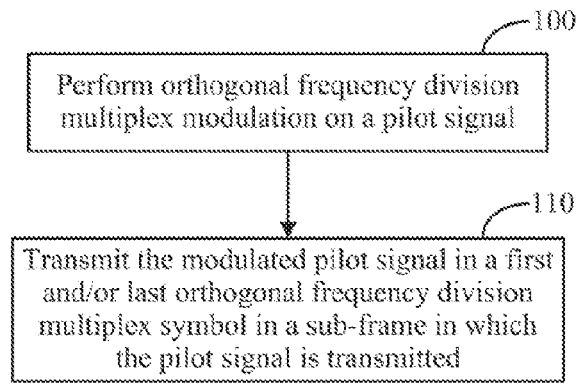
FIG. 1 illustrates a flow chart of a first method at the transmitter side according to an embodiment of the invention.

An embodiment of the invention provides a method for transmitting a pilot signal by a transmitter, where an implementation thereof as illustrated in FIG. 1 particularly includes the following operations:

The operation 100 is to OFDM-modulate a pilot signal.

OFDM modulation in the embodiment of the invention can be traditional OFDM modulation or can be extended OFDM-modulation, e.g., discrete Fourier Transform-Spread-Orthogonal Frequency Division Multiplex (DFT-S-OFDM) modulation.

The operation 110 is to transmit the modulated pilot signal in a first and/last OFDM symbol in a sub-frame in which the pilot signal is transmitted.

The OFDM symbol in the embodiment of the invention can be an OFDM symbol resulting from traditional OFDM modulation or can be a spread OFDM symbol resulting from spread OFDM modulation, e.g., a DFT-S-OFDM symbol.

In order to achieve higher precision of channel estimation, the modulated pilot signal may be transmitted in the first and last OFDM symbols.

Preferably the pilot signal can be OFDM-modulated by mapping the pilot signal to a set of even sub-carriers of the first and/or last OFDM symbol to generate the frequency-domain pilot signal; or mapping the pilot signal to a set of odd sub-carriers of the first and/or last OFDM symbol to generate the time-domain pilot signal; and then modulating the frequency-domain pilot signal in the time domain. The set of even sub-carriers can refer to a set including all the even sub-carriers or can be a subset of the set including all the even sub-carriers. The set of odd sub-carriers can refer to a set including all the odd sub-carriers or can be a subset of the set including all the odd sub-carriers.

It shall be noted that following the preferred implementation in which the pilot signal is OFDM-modulated in the frequency domain according to the embodiment of the invention, those skilled in the art can derive hereby such an implementation without any inventive effort in which the pilot signal is OFDM-modulated in the frequency domain, that is, in traditional OFDM modulation, firstly the serial pilot signal is serial-to-parallel converted, and the parallel pilot signal is mapped to the sub-carriers according to the mapping rule above; and in DFT-S-OFDM modulation, firstly the serial pilot signal is serial-to-parallel converted, and the parallel pilot signal is DFT-transformed and further mapped to the sub-carriers according to the mapping rule above.

If the pilot signal is mapped to the set of even sub-carriers or the set of odd sub-carriers of the first and/or last OFDM symbol, and then is subjected to the frequency domain to the time domain to generate the time-domain signal, where a first half and a second half of the time-domain signal are repeated, or the difference between values of the first half and the second half is a fixed constant, and the first half and the second half of the time-domain signal carry the pilot signal respectively. Thus if the transmitter needs to be switched between transmitting and receiving, then the pilot signal can be transmitted in the half of the time-domain signal, and if the receiver needs to be switched between transmitting and receiving, then the pilot signal can be obtained in the half of the time-domain signal.

Further to the preferred modulation scheme above, the frequency-domain pilot signal can be modulated in the time domain by: performing the frequency-to-time conversion process on the frequency-domain pilot signal to generate the first time-domain signal, the length of which is less than the length of an OFDM symbol for data transmission, and no less than half the length of the data portion in the OFDM symbol in which data are transmitted.

In the embodiment of the invention, the data portion in the OFDM symbol refers to a portion other than the CP. If no CP is transmitted, then the length of the data portion in the OFDM symbol is equal to the length of the OFDM symbol.

Specially the first time-domain signal can be generated by performing the frequency-to-time conversion process on the frequency-domain pilot signal, particularly by performing the frequency-to-time conversion process on the frequency-domain pilot signal to generate such a second time-domain signal that both a first half of the second time-domain signal and a second half of the second time-domain signal carry the pilot signal; and intercepting a segment of continuous time-domain signal from the second time-domain signal to generate the first time-domain signal, where the first time-domain signal includes at least the first half of the second time-domain signal or the second half of the second time-domain signal.

Optionally the first time-domain signal can further carry a CP. Then the first time-domain signal can be generated by intercepting a segment of continuous time-domain signal from the second time-domain signal, and adding the CP to the intercepted segment of continuous time-domain signal to generate the first time-domain signal, the first time-domain signal includes at least the first half of the second time-domain signal or the second half of the second time-domain signal, and further the CP. The first time-domain signal can alternatively be generated by adding the CP before the second time-domain signal, intercepting the CP, and a segment of continuous time-domain signal starting from a starting position of the second time-domains signal to generate the first time-domain signal, the first time-domain signal includes at least the first half of the second time-domain signal or the second half of the second time-domain signal, and further the CP.

Implementations in which the pilot signal is OFDM-modulated in the time domain will be described below in details for different scenarios.

If a period of time for switching between transmitting and receiving for the transmitter is not taken into account, then the signal can be transmitted in the entire OFDM symbol. The length in the time domain of a first OFDM symbol and/or a last OFDM symbol in a sub-frame in which the pilot signal is transmitted can be the same as the length in the time domain of an OFDM symbol for data transmission, and the first OFDM symbol and/or the last OFDM symbol in the sub-frame in which the pilot signal is transmitted can also be a short OFDM symbol.

If a period of time for switching between transmitting and receiving for the transmitter is not taken into account, and the pilot signal is transmitted in a short OFDM symbol, then the frequency-domain pilot signal can be modulated in the time domain particularly by converting the frequency-domain pilot signal into the second time-domain signal, intercepting a segment of continuous time-domain signal with a length no less than half the length of the second time-domain signal after a starting position of the second time-domain signal or before an ending position of the second time-domain signal, to generate the first time-domain signal. The segment of continuous time-domain signal can be intercepted with a predetermined length which can be determined particularly in any way applicable to the embodiment of the invention. Preferably the segment of continuous time-domain signal can be intercepted with a length which is half the length of the second time-domain signal. Accordingly the length in the time domain of the first and/or last OFDM symbol of the sub-frame in which the pilot signal is transmitted is the length of the first time-domain signal and less than the length in the time domain of the OFDM symbol for data transmission, i.e., a short OFDM symbol.

Optionally if the first time-domain signal further carries a CP, then the CP can be added before the second time-domain signal, and the CP, and a segment of continuous time-domain signal with a length no less than half the length of the second time-domain signal after a starting position of the second time-domain signal can be intercepted to generate the first time-domain signal; or a segment of continuous time-domain signal with a length no less than half the length of the second time-domain signal after a starting position of the second time-domain signal can be intercepted, and the CP can be added before the cropped time-domain signal to generate the first time-domain signal; or a segment of continuous time-domain signal with a length no less than half the length of the second time-domain signal before an ending position of the second time-domain signal can be cropped, and the CP can be added before the intercepted time-domain signal. The length of the added CP can be determined dependent upon a communication demand, through simulation or by a communication standard, for example, a normal CP or an extended CO defined in the existing communication standard.

An overhead of resources for the pilot signal can be further lowered by transmitting the pilot signal in the short OFDM symbol.

Figure 2:
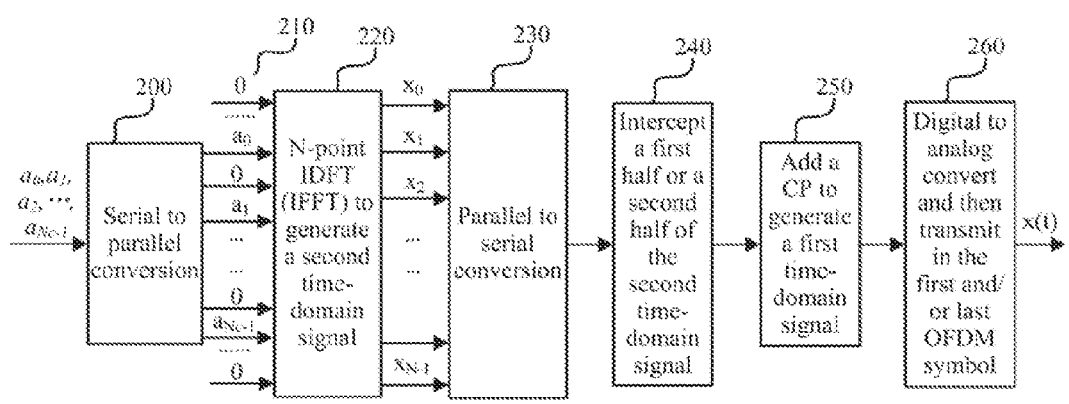
FIG. 2 illustrates a flow chart of a second method at the transmitter side according to an embodiment of the invention.

Of course, OFDM modulation on the pilot signal in the time domain further involves parallel-to-serial conversion, digital/analog conversion, and other operations. Taking traditional OFDM modulation as an example, if there are a number N of points involved in frequency domain to time domain conversion during OFDM modulation, then an implementation in which the entire pilot signal is transmitted in the first and/or last short OFDM symbol in the sub-frame is as illustrated in FIG. 2:

The operation 200 is to perform serial to parallel conversion on the serial pilot signal $(a_0, a_1, a_2, \ldots a_{N_c-1})$.

The operation 210 is to map the parallel pilot signal $(a_0, a_1, a_2, \ldots a_{N_c-1})$ to a set of even sub-carriers (or a set of odd sub-carriers) to generate the frequency-domain pilot signal.

Here a zero is mapped to a sub-carrier to which no pilot signal is mapped.

The operation 220 is to perform N-point Inverse Discrete Fourier Transform (IDFT) or N-point Inverse Fast Fourier Transform (IFFT) on the frequency-domain pilot signal to generate the second time-domain signal $(x_0, x_1, x_2, \ldots x_{N-1})$.

IDFT and IFFT have been described as an example in the embodiment of the invention, but it shall be noted that frequency domain to time domain conversion can alternatively be performed otherwise.

Preferably the length of the second time-domain signal $(x_0, x_1, x_2, \ldots x_{N-1})$ is no more than the length of the OFDM symbol in the time domain, for example, the length of the time-domain signal $(x_0, x_1, x_2, \ldots x_{N-1})$ is the length of the OFDM symbol in the time domain.

The operation 230 is to perform parallel to serial conversion on the second time-domain signal $(x_0, x_1, x_2, \ldots x_{N-1})$.

The operation 240 is to intercept a first half or a second half of the parallel time-domain signal $(x_0, x_1, x_2, \ldots x_{N-1})$.

It shall be noted that alternatively a segment of time-domain signal can be firstly intercepted from the serial second time-domain signal $(x_0, x_1, x_2, \ldots x_{N-1})$, and then parallel to serial conversion can be performed on the intercepted segment of time-domain signal.

The operation 250 is to add a CP before the intercepted segment of time-domain signal to generate the first time-domain signal.

It shall be noted that alternatively a CP can be added before the parallel second time-domain signal $(x_0, x_1, x_2, \ldots x_{N-1})$, and then the CP, and the first half of the second time-domain signal can be intercepted as the first time-domain signal.

The length of the first time-domain signal is the length in the time domain of the short OFDM symbol in which the pilot signal is transmitted.

The operation 260 is to perform digital to analog conversion on the first time-domain signal to generate the first time-domain signal x(t) in the form of an analog signal, and to transmit x(t) in the first short OFDM symbol and/or the last short OFDM symbol in the sub-frame, where x(t) represents the modulated pilot signal.

It shall be noted that the OFDM symbol and the short OFDM symbol have been described in the embodiment of the invention. Unless the short OFDM symbol is stated, the OFDM symbol as referred to in this context will refer to an OFDM symbol with the same length in the time domain as an OFDM symbol in which a data signal is transmitted.

If a period of time for switching between transmitting and receiving for the transmitter is not taken into account, and the length in the time domain of the first OFDM symbol and/or the last OFDM symbol in the sub-frame in which the pilot signal is transmitted is the same as the length in the time domain of the OFDM symbol in which data are transmitted, then the frequency-domain pilot signal can be modulated in the time domain particularly by converting the frequency-domain pilot signal into the second time-domain signal, which is the modulated pilot signal, with a length which is the length in the time domain of the first and/or the last OFDM symbol in the sub-frame in which the pilot signal is transmitted. Accordingly the second time-domain signal, which is the modulated pilot signal, is transmitted in the first and/or last OFDM symbol in the sub-frame.

Optionally if the second time-domain signal further carries the CP, then the frequency-domain pilot signal can be converted into a time-domain signal, and the CP can be added before the time-domain signal to generate the second time-domain signal. The length of the added CP can be determined dependent upon a communication demand, the simulation or a communication standard, for example, a normal CP or an extended CP defined in the existing communication standard.

Figure 3:
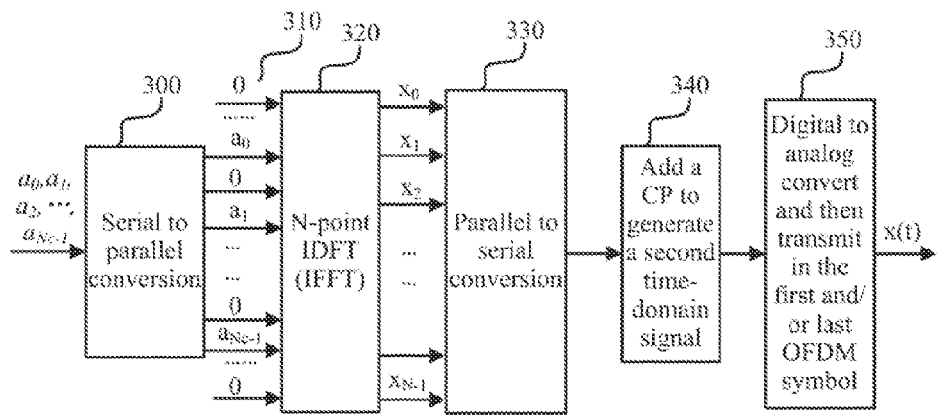
FIG. 3 illustrates a flow chart of a third method at the transmitter side according to an embodiment of the invention.

Of course. OFDM modulation on the pilot signal in the time domain further involves parallel-to-serial conversion, digital to analog conversion, and other operations. Taking traditional OFDM modulation as an example, if there are a number N of points involved in frequency domain to time domain conversion during OFDM modulation, then an implementation in which the entire pilot signal is transmitted in the first and/or last OFDM symbol in the sub-frame is as illustrated in FIG. 3:

The operation 300 is to perform serial to parallel conversion on the serial pilot signal $(a_0, a_1, a_2, \ldots a_{Nc-1})$.

The operation 310 is to map the parallel pilot signal $(a_0, a_1, a_2, \ldots a_{Nc-1})$ to a set of even sub-carriers (or a set of odd sub-carriers) to generate the frequency-domain pilot signal.

Here for a sub-carrier to which no pilot signal is mapped, a zero is mapped thereto.

The operation 320 is to perform N-point IDFT or N-point IFFT on the frequency-domain pilot signal to generate a time-domain signal $(x_0, x_1, x_2, \ldots x_{N-1})$.

IDFT and IFFT have been described as an example in the embodiment of the invention, but it shall be noted that frequency domain to time domain conversion can alternatively be performed otherwise.

The operation 330 is to perform parallel to serial conversion on the time-domain signal $(x_0, x_1, x_2, \ldots x_{N-1})$.

The operation 340 is to add a CP before the serial time-domain signal $(x_0, x_1, x_2, \ldots x_{N-1})$ to generate the second time-domain signal.

The length of the second time-domain signal is the length in the time domain of the OFDM symbol in which the pilot signal is transmitted.

The operation 350 is to perform digital to analog conversion on the second time-domain signal to generate the second time-domain signal x(t) in the form of an analog signal, and to transmit x(t) in the first short OFDM symbol and/or the last short OFDM symbol in the sub-frame, where x(t) represents the modulated pilot signal.

If the transmitter needs to be switched between transmitting and receiving, or the possibility of the transmitter to be switched between transmitting and receiving needs to be taken into account, then a period of time for switching between transmitting and receiving needs to be reserved. Particularly a guard period which is no less than the period of time for switching between transmitting and receiving can be set so that no signal will be transmitted in the guard period. If there is a guard period in the sub-frame, then for the first OFDM symbol in the sub-frame, a starting position of the guard period is a starting position of the OFDM symbol, and for a last OFDM symbol in the sub-frame, an ending position of the guard period is an ending position of the OFDM symbol. The frequency-domain pilot signal can be modulated in the time domain particularly by converting the frequency-domain pilot signal into the second time-domain signal, and intercepting a segment of continuous time-domain signal with a length no less than half the length of the second time-domain signal after the starting position of or before the ending position of the second time-domain signal to generate the first time-domain signal. The length of the segment of continuous time-domain signal can be intercepted with a predetermined length which can be determined particularly in any way applicable to the embodiment of the invention, where the sum of the length of the first time-domain signal and the length of the guard period is the length in the time domain of the first and/or last OFDM symbol in which the pilot signal is transmitted.

Optionally the first time-domain signal further carries the CP. If the pilot signal is transmitted in the first OFDM symbol, then preferably the first half or the second half of the second time-domain signal can be intercepted, and the CP can be added before the intercepted time-domain signal to generate the first time-domain signal, where the first time-domain signal includes at least the first half or the second half of the second time-domain signal, and further the CP, and the length of the CP is the length of the OFDM symbol in the time domain minus the length of the guard period minus the length of half the second time-domain signal. If the pilot signal is transmitted in the last OFDM symbol, then preferably the first half or the last half of the second time-domain signal is intercepted, and the CP is added before the intercepted time-domain signal to generate the first time-domain signal, where the first time-domain signal includes the first half or the second half of the second time-domain signal, and further includes the CP, and the length of the CP is the length of the OFDM symbol in the time domain minus the length of the guard period and further minus the length of half the second time-domain signal; or preferably the CP is added before the second time-domain signal, and the CP, and the first half of the second time-domain are intercepted to generate the first time-domain signal, where the first time-domain signal includes the first half of the second time-domain signal, and further includes the CP, and the length of the CP is the length of the OFDM symbol in the time domain minus the length of the guard period minus the length of half the second time-domain signal.

If there is a guard period in the sub-frame, then after the pilot signal is modulated as described in the embodiment above, the modulated pilot signal can be transmitted in the first OFDM symbol in the sub-frame particularly by transmitting the first time-domain signal, which is the modulated pilot signal, in a time domain range from an ending position of the guard period to an ending position of the first OFDM symbol in the sub-frame.

If there is a guard period in the sub-frame, then after the pilot signal is modulated as described in the embodiment above, the modulated pilot signal can be transmitted in the last OFDM symbol in the sub-frame particularly by transmitting the first time-domain signal, which is the modulated pilot signal, in a time domain range from the starting position of the last OFDM symbol in the sub-frame to a starting position of the guard period.

Figure 4:
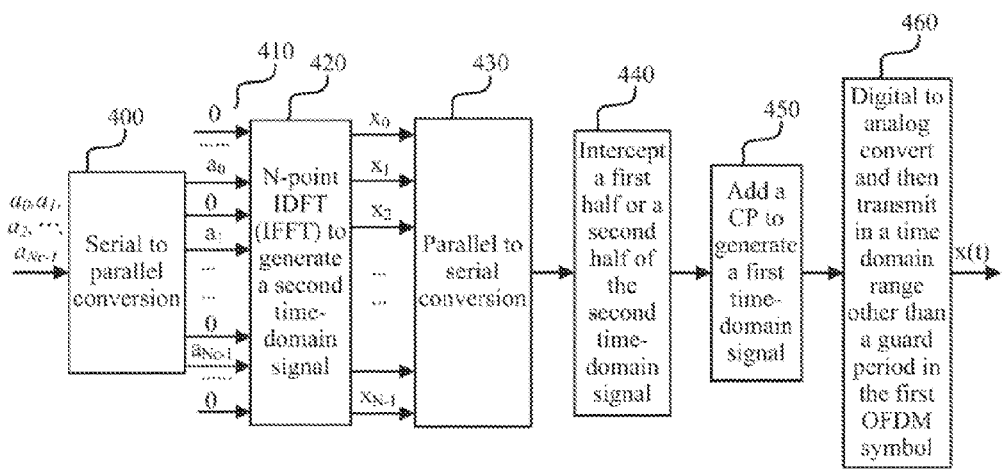
FIG. 4 illustrates a flow chart of a fourth method at the transmitter side according to an embodiment of the invention.

Taking traditional OFDM modulation as an example, if there are a number N of points involved in frequency domain to time domain conversion during OFDM modulation, then an implementation in which the pilot signal is transmitted in the first OFDM symbol in the sub-frame is as illustrated in FIG. 4:

The operation 400 is to perform serial to parallel conversion on the serial pilot signal ($a_0, a_1, a_2, \ldots a_{Nc-1}$).

The operation 410 is to map the parallel pilot signal ($a_0, a_1, a_2, \ldots a_{Nc-1}$) to a set of even sub-carriers (or a set of odd sub-carriers) to generate the frequency-domain pilot signal. Here for a sub-carrier to which no pilot signal is mapped, a zero is mapped thereto.

The operation 420 is to perform N-point IDFT or N-point IFFT on the frequency-domain pilot signal to generate the second time-domain signal ($x_0, x_1, x_2, \ldots x_{N-1}$).

IDFT and IFFT have been described as an example in the embodiment of the invention, but it shall be noted that frequency domain to time domain conversion can alternatively be performed otherwise.

The operation 430 is to perform parallel to serial conversion on the second time-domain signal ($x_0, x_1, x_2, \ldots x_{N-1}$).

The operation 440 is to intercept the first half or the second half of the parallel second time-domain signal ($x_0, x_1, x_2, \ldots x_{N-1}$).

It shall be noted that alternatively first a segment of continuous time-domain signal can be intercepted from the serial second time-domain signal ($x_0, x_1, x_2, \ldots x_{N-1}$), and then parallel to serial conversion can be performed on the intercepted time-domain signal.

Intercepting of half the second time-domain signal has been described as an example in the embodiment illustrated in FIG. 4, but the embodiment of the invention will not be limited only to intercepting of half the second time-domain signal, and the length of the intercepted segment of continuous time-domain signal can alternatively be more than half the second time-domain signal.

The operation 450 is to add a CP before the intercepted time-domain signal to generate the first time-domain signal The length of the added CP equals to the length of the OFDM symbol in the time domain minus the length half the second time-domain signal minus the length of the guard period.

The operation 460 is to perform digital to analog conversion on the first time-domain signal to generate the first time-domain signal x(t) in the form of an analog signal, and to transmit x(t), starting with an ending position of the guard period, in the first OFDM symbol in the sub-frame, where x(t) represents the modulated pilot signal.

Figure 5:
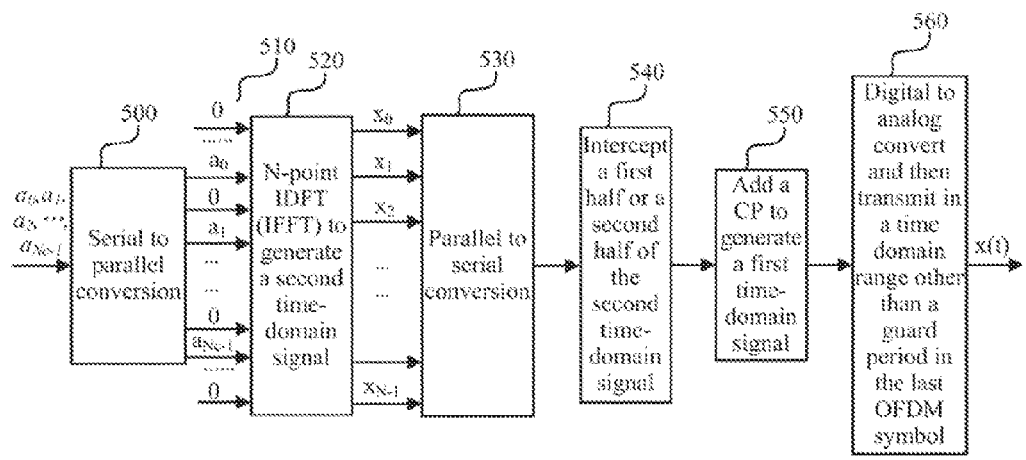
FIG. 5 illustrates a flow chart of a fifth method at the transmitter side according to an embodiment of the invention.

Taking traditional OFDM modulation as an example, if there are a number N of points involved in frequency domain to time domain conversion during OFDM modulation, then an implementation in which the pilot signal is transmitted in the last OFDM symbol in the sub-frame is as illustrated in FIG. 5:

The operation 500 is to perform serial to parallel conversion on the serial pilot signal ($a_0, a_1, a_2, \ldots a_{Nc-1}$).

The operation 510 is to map the parallel pilot signal ($a_0, a_1, a_2, \ldots a_{Nc-1}$) to a set of even sub-carriers (or a set of odd sub-carriers) to generate the frequency-domain pilot signal.

Here for a sub-carrier to which no pilot signal is mapped, a zero is mapped thereto.

The operation 520 is to perform N-point IDFT or N-point IFFT on the frequency-domain pilot signal to generate the second time-domain signal ($x_0, x_1, x_2, \ldots x_{N-1}$).

IDFT and IFFT have been described as an example in the embodiment of the invention, but it shall be noted that frequency domain to time domain conversion can alternatively be performed otherwise.

The operation 530 is to perform parallel to serial conversion on the second time-domain signal ($x_0, x_1, x_2, \ldots x_{N-1}$).

The operation 540 is to intercept the first half or the second half of the parallel second time-domain signal ($x_0, x_1, x_2, \ldots x_{N-1}$).

It shall be noted that alternatively first a segment of continuous time-domain signal can be intercepted from the serial second time-domain signal ($x_0, x_1, x_2, \ldots x_{N-1}$), and then parallel to serial conversion can be performed on the intercepted time-domain signal.

Intercepting of half the second time-domain signal has been described as an example in the embodiment illustrated in FIG. 5, but the embodiment of the invention will not be limited only to intercepting of half the second time-domain signal, and the length of the intercepted segment of continuous time-domain signal can alternatively be more than half the second time-domain signal.

The operation 550 is to add a CP before the intercepted time-domain signal to generate the first time-domain signal.

The length of the added CP equals to the length of the OFDM symbol in the time domain minus the length half the second time-domain signal minus the length of the guard period.

The operation 560 is to perform digital to analog conversion on the first time-domain signal to generate the first time-domain signal x(t) in the form of an analog signal, and to transmit x(t) between a starting position of the first OFDM symbol in the sub-frame and a starting position of the guard period, where x(t) represents the modulated pilot signal.

Figure 6:
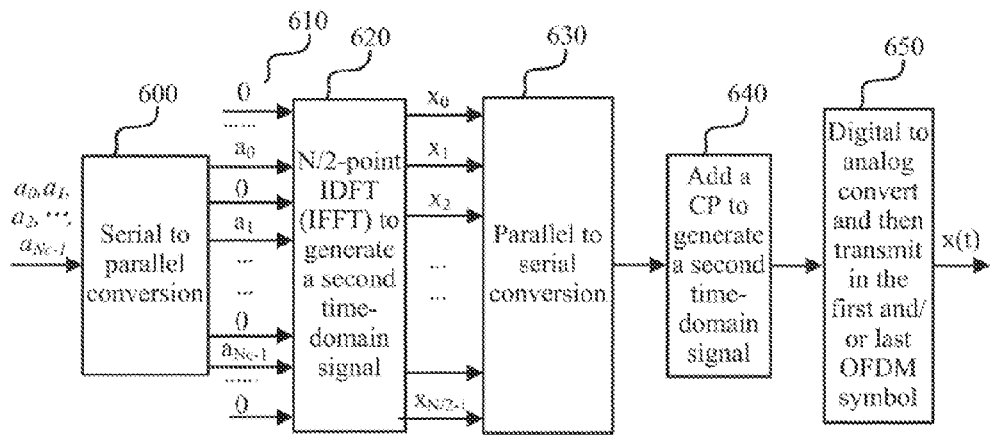
FIG. 6 illustrates a flow chart of a sixth method at the transmitter side according to an embodiment of the invention.

The frequency-domain pilot signal can alternatively be converted into the first time-domain signal directly using N/2-point IDFT or N/2-point IFFT, and for example, as illustrated in FIG. 6, a particular process thereof is as follows:

The operation 600 is to perform serial to parallel conversion on the serial pilot signal $(a_0, a_1, a_2, \ldots a_{Nc-1})$.

The operation 610 is to map the parallel pilot signal $(a_0, a_1, a_2, \ldots a_{Nc-1})$ to a set of sub-carriers to generate the frequency-domain pilot signal.

Here for a sub-carrier to which no pilot signal is mapped, a zero is mapped thereto.

The operation 620 is to perform N/2-point IDFT or N/2-point IFFT on the frequency-domain pilot signal to generate a time-domain signal $(x_0, x_1, x_2, \ldots x_{N/2-1})$.

Here N represents the number of points involved in IDFT or IFFT transform of the OFDM symbol in which data are transmitted.

IDFT and IFFT have been described as an example in the embodiment of the invention, but it shall be noted that frequency domain to time domain conversion can alternatively be performed by other method.

The operation 630 is to perform parallel to serial conversion on the time-domain signal $(x_0, x_1, x_2, \ldots x_{N/2-1})$.

The operation 640 is to add a CP before the serial time-domain signal $(x_0, x_1, x_2, \ldots x_{N/2-1})$ to generate the first time-domain signal.

The length of the first time-domain signal is less than the length in the time domain of the OFDM symbol in which data are transmitted.

The operation 650 is to perform digital to analog conversion on the first time-domain signal to generate the first time-domain signal x(t) in the form of an analog signal, and to transmit x(t) in the first OFDM symbol and/or the last OFDM symbol of the sub-frame, where x(t) represents the modulated pilot signal.

Figure 7:
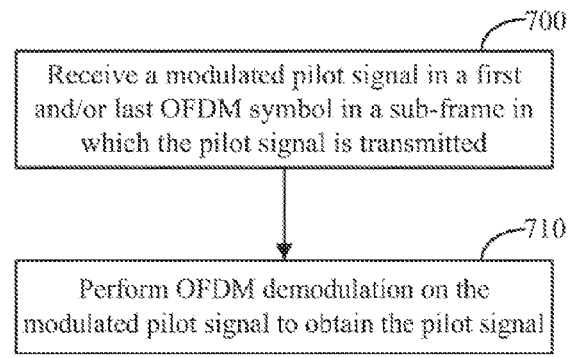
FIG. 7 illustrates a flow chart of a first method at the receiver side according to an embodiment of the invention.

An embodiment of the invention provides a method for receiving a pilot signal by a pilot signal receiver, where an implementation thereof as illustrated in FIG. 7 particularly includes the following operations:

The operation 700 is to receive a modulated pilot signal in a first and/or last OFDM symbol of a sub-frame in which the pilot signal is transmitted.

The OFDM symbol in the embodiment of the invention can be an OFDM symbol resulting from traditional OFDM modulation or can be a spread OFDM symbol resulting from spread OFDM modulation, e.g., a DFT-S-OFDM symbol.

The operation 710 is to OFDM-demodulate the modulated pilot signal into the pilot signal.

OFDM demodulation in the embodiment of the invention can be traditional OFDM demodulation or can be extended OFDM demodulation, e.g., discrete Fourier Transform-Spread-Orthogonal Frequency Division Multiplex (DFS-S-OFDM) demodulation.

Reference can be made to the description of the embodiment of the method at the transmitter side for the same or similar technical features in the embodiment of the method at the receiver side as or to those of the transmitter, so a repeated description thereof will be omitted here.

Preferably the modulated pilot signal can be OFDM-demodulated into the pilot signal particularly by performing time to frequency conversion on the modulated pilot signal to generate the frequency-domain pilot signal; and de-mapping the frequency-domain pilot signal to obtain the pilot signal from a set of even sub-carriers, or de-mapping the frequency-domain pilot signal to obtain the pilot signal from a set of odd sub-carriers.

It shall be noted that following the preferred implementation in which the pilot signal is OFDM-demodulated in the frequency domain according to the embodiment of the invention, those skilled in the art can derive hereby such an implementation without any inventive effort in which the pilot signal is OFDM-demodulated in the frequency domain, that is, firstly the frequency-domain pilot signal is de-mapped, the parallel pilot signal is obtained from the set of even sub-carriers or the set of odd sub-carriers, and the parallel pilot signal is equalized into the serial pilot signal.

Further to the preferred demodulation scheme, the length of the modulated pilot signal is no less than half the length of a data segment in an orthogonal frequency division multiplex symbol in which data are transmitted, and the length of the modulated pilot signal is less than the length of the data segment in the orthogonal frequency division multiplex symbol in which data are transmitted. That is, if a transmitter maps the pilot signal to the odd or even sub-carriers to obtain the frequency-domain pilot signal, and the frequency-domain pilot signal is frequency to time-converted into the second time-domain signal, then the length of the modulated pilot signal received by the receiver is no less than half the length of the second time-domain signal.

The signal transmitted by the transmitter will be attenuated in transmission over a channel. Thus the modulated pilot signal received by the receiver is a channel response signal of the modulated pilot signal transmitted by the transmitter. In the embodiment of the invention, the modulated pilot signal transmitted over the channel includes at least a channel response signal of half the second time-domain signal and has a length more than the length of half the second time-domain signal. It shall be noted that both the first half of the second time-domain signal and the second half of the second time-domain signal carry the pilot signal, and accordingly both the channel response signal of the first half of the second time-domain signal and the channel response signal of the second half of the second time-domain signal also carry the pilot signal.

Optionally the received modulated pilot signal can further carry the CP. Then the modulated signal includes at least the channel response signal of the first half of the second time-domain signal or the channel response signal of the second half of the second time-domain signal, and further includes the CP arranged before the channel response signal of the first half of the second time-domain signal or the channel response signal of the second half of the second time-domain signal.

Since the length of the modulated pilot signal is no less than half the length of the data portion in the orthogonal frequency division multiplex symbol in which data are transmitted, and the length of the modulated pilot signal is less than the length of the data portion in the orthogonal frequency division multiplex symbol in which data are transmitted, implementations of the method at the receiver side will be described below in details for different scenarios.

If a first OFDM symbol and/or a last OFDM symbol of a sub-frame in which the transmitter transmits the pilot signal is a short OFDM symbol, and a period of time for switching between transmitting and receiving for the receiver will not be taken into account, then the length of the modulated pilot signal is the length in the time domain of the first and/or last OFDM symbol of the sub-frame in which the pilot signal is transmitted, i.e., the length in the time domain of a short OFDM symbol in which the pilot signal is transmitted.

Optionally if the received modulated pilot signal further carries the CP, then the modulated pilot signal being converted into the frequency-domain pilot signal refers to removing the CP from the received modulated pilot signal and then converting it into the frequency-domain pilot signal.

Figure 8:
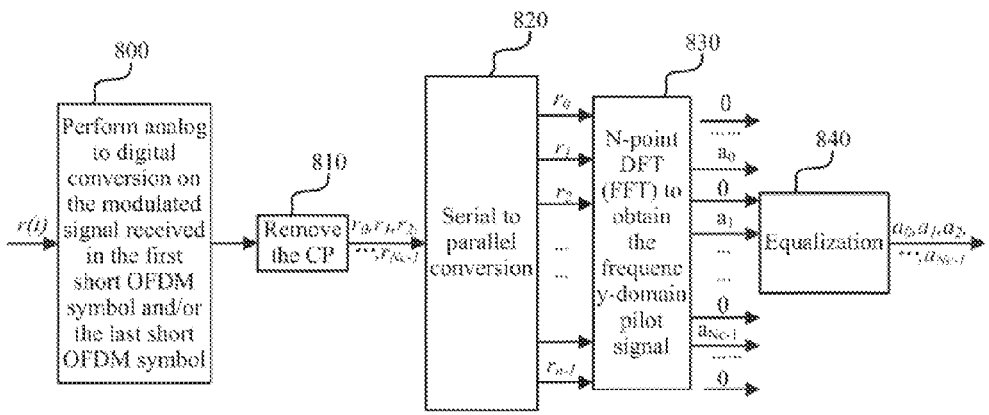
FIG. 8 illustrates a flow chart of a second method at the receiver side according to an embodiment of the invention.

Of course, OFDM demodulation on the pilot signal in the time domain further involves analog to digital conversion, serial-to-parallel conversion, and other operations. FIG. 8 illustrates an implementation in which the pilot signal is received in the first and/or last short OFDM symbol of the sub-frame as follows:

The operation 800 is to perform analog to digital conversion on a time-domain signal r(t) in the form of an analog signal received in the first short OFDM symbol and/or the last short OFDM symbol of the sub-frame to obtain a time-domain signal in the form of a digital signal, where r(t) represents the modulated pilot signal.

The operation 810 is to remove the CP carried in the time-domain signal in the form of the digital signal.

The operation 820 is to perform serial to parallel conversion on the time-domain signal from which the CP is removed.

The operation 830 is to perform N-point Discrete Fourier Transform (DFT) or N-point Fast Fourier Transform (FFT) on the parallel time-domain signal to generate the frequency-domain pilot signal.

The operation 840 is to de-map (i.e., equalization processing) the frequency-domain pilot signal to obtain the pilot signal ($a_0, a_1, a_2, \ldots a_{Nc-1}$) from the set of odd sub-carriers or the set of even sub-carriers.

It shall be noted that the time-domain signal from which the CP is removed can be converted into the frequency-domain pilot signal particularly by processing the time-domain signal as described above directly, or repeating the channel response signal of half the second time-domain signal, included in the time-domain signal from which the CP is removed, to obtain the channel response channel of the second time-domain signal, and further performing N-point DFT or N-point FFT conversion on the channel response signal of the second time-domain signal to obtain the frequency-domain pilot signal.

As described in the method above of the transmitter, the length of the first time-domain signal may be half the second time-domain signal. The length of the first time-domain signal may be more than half the second time-domain signal. The receiver knows in advance the length of the channel response signal of the first time-domain signal. If the length thereof is more than half the second time domain signal, then the receiver will further obtain in advance whether the first time-domain signal is intercepted after the starting position of the second time-domain signal or before the ending position of the second time-domain signal; and accordingly in the process above, after the CP is removed, the channel response signal of half the second time-domain signal, carried in the received time-domain signal will be further determined from the information known in advance, and the frequency-domain pilot signal will be obtained from the channel response signal of half the second time-domain signal.

If the transmitter transmits the pilot signal in an OFDM symbol other than a guard period, or the receiver needs to be switched between transmitting and receiving, or the receiver needs to take into account the possibility of being switched between transmitting and receiving, then the pilot signal will be received in the OFDM symbol other than the guard period. If there is a guard period in the sub-frame, then the sum of the length of the modulated pilot signal and the length of the guard period will be the length in the time domain of the first and/or last OFDM symbol in the sub-frame in which the pilot signal is transmitted.

If there is a guard period in the sub-frame, then the modulated pilot signal can be received in the first OFDM symbol in the sub-frame particularly by receiving the modulated pilot signal in the time domain range from the ending position of the guard period to the ending position of the first OFDM symbol in the sub-frame, where the starting position of the guard period is the starting position of the first OFDM symbol in the sub-frame.

FIG. 8 illustrates an implementation in which the pilot signal is transmitted in the first OFDM symbol in the sub-frame.

Here the receiver knows in advance the length of the channel response signal of the first time-domain signal, and also the position, of the channel response signal of half the second time-domain signal, in the channel response signal of the first time-domain signal. Accordingly the receiver determines from the information known in advance the channel response signal of half the second time-domain signal, carried in the channel response signal of the first time-domain signal, and obtains the frequency-domain pilot signal from channel response signal of half the second time-domain signal.

If there is a guard period in the sub-frame, then the modulated pilot signal can be received in the last OFDM symbol in the sub-frame particularly by: receiving the modulated pilot signal in the time domain range from the starting position of the last OFDM symbol in the sub-frame to the starting position of the guard period, where the ending position of the guard period is the ending position of the last OFDM symbol in the sub-frame.

If there is a guard period in the sub-frame, then the receiver can alternatively receive only the modulated pilot signal corresponding to half the second time-domain signal. Accordingly the modulated pilot signal can be received in the first OFDM symbol of the sub-frame particularly by: receiving the modulated pilot signal corresponding to half the second time-domain signal in the time domain range from the ending position of the guard period to the ending position of the first orthogonal frequency division multiplex symbol in the sub-frame, where the modulated pilot signal corresponding to half the second time-domain signal is the channel response signal of the first half or the second half of the second time-domain signal, the second time-domain signal is obtained by the transmitter performing frequency domain to time domain conversion on the frequency-domain pilot signal, and both the first half of the second time-domain signal and the second half of the second time-domain signal carry the pilot signal. In this embodiment, the receiver knows in advance the position, of the time-domain signal corresponding to half the second time-domain signal, in the OFDM symbol, this can be known as prescribed or configured, or from a message transmitted by the transmitter, the message carrying information about the position, of the time-domain signal corresponding to half the second time-domain signal, in the OFDM symbol. The second time-domain signal is obtained by the transmitter performing frequency domain to time domain conversion on the frequency-domain pilot signal, where both the first half of the second time-domain signal and the second half of the second time-domain signal carry the pilot signal, and the time-domain signal corresponding to half the second time-domain signal is the channel response signal of half the second time-domain signal.

If there is a guard period in the sub-frame, then the receiver receiving only the modulated pilot signal corresponding to half the first time-domain signal can receive the modulated pilot signal in the last OFDM symbol in the sub-frame particularly by receiving the modulated pilot signal corresponding to half the second time-domain signal in the time domain range from the starting position of the last OFDM symbol in the sub-frame to the starting position of the guard period, where the modulated pilot signal corresponding to half the second time-domain signal is the channel response signal of the first half or the second half of the second time-domain signal, the second time-domain signal is obtained by the transmitter performing frequency domain to time domain conversion on the frequency-domain pilot signal, and both the first half of the second time-domain signal and the second half of the second time-domain signal carry the pilot signal. In this embodiment, the receiver knowing in advance the position, of the time-domain signal corresponding to half the second time-domain signal, in the OFDM symbol can know the position as prescribed or configured, or can know it from a message, transmitted by the transmitter, the message carrying information about the position, of the time-domain signal corresponding to half the second time-domain signal, in the OFDM symbol, where the second time-domain signal is obtained by the transmitter performing frequency domain to time domain conversion on the frequency-domain pilot signal, where the second time-domain signal is obtained by the transmitter performing frequency domain to time domain conversion on the frequency-domain pilot signal, both the first half of the second time-domain signal and the second half of the second time-domain signal carry the pilot signal, and the time-domain signal corresponding to half the second time-domain signal is the channel response signal of half the second time-domain signal.

In the embodiment of the invention, the length of the modulated pilot signal can alternatively be the length in the time domain of the first and/or last OFDM symbol in the sub-frame in which the pilot signal is transmitted, which is equal to the length of an OFDM symbol in which data are transmitted.

Optionally if the received modulated pilot signal further carries the CP, then the received modulated pilot signal is converted into the frequency-domain pilot signal by firstly removing the CP from the time-domain signal, and then converting it into the frequency-domain pilot signal.

The technical solutions according to the embodiments of the invention can be also applicable to multi-antenna transmission. For example, if pilot signals of multiple antenna ports need to be transmitted between D2D UEs, then the pilot signals of the multiple antenna ports can be distinguished through time division, frequency division, code division, etc., and the pilot signals of the antenna ports can still be transmitted according to the embodiments of the invention.

Figure 9:
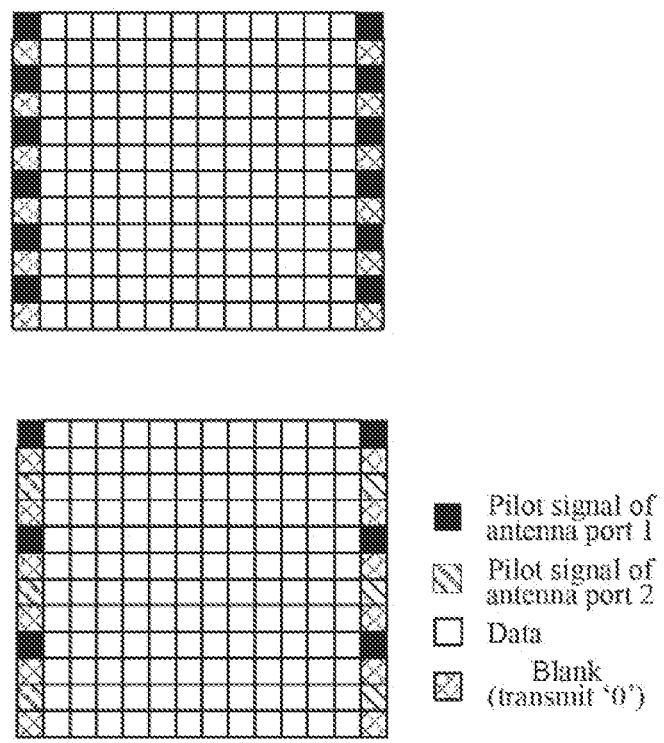
FIG. 9 illustrates a schematic structural diagram of a multi-antenna port pilot signal according to an embodiment of the invention.

Taking pilot signals of multiple antenna ports with frequency division as an example, a structure thereof is as illustrated in an upper pattern in FIG. 9, whereas a lower pattern in FIG. 9 illustrates a structural diagram of a pilot signal taking a single antenna port (which is an antenna port 1) as an example.

Figure 10:
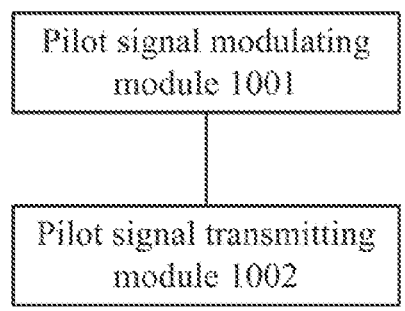
FIG. 10 illustrates a schematic structural diagram of a pilot signal transmitter according to an embodiment of the invention.

Based upon the same inventive idea as the method, an embodiment of the invention further provides a pilot signal transmitter the structure thereof as illustrated in FIG. 10, which particularly structurally includes:

A pilot signal modulating module 1001 is configured to perform orthogonal frequency division multiplex modulation on a pilot signal; and A pilot signal transmitting module 1002 is configured to transmit the modulated pilot signal in a first and/or last orthogonal frequency division multiplex symbol of a sub-frame in which the pilot signal is transmitted.

Preferably the pilot signal modulating module 1001 is configured:

To map the pilot signal to a set of even sub-carriers of the first and/or last orthogonal frequency division multiplex symbol to generate a frequency-domain pilot signal; or to map the pilot signal to a set of odd sub-carriers of the first and/or last orthogonal frequency division multiplex symbol to generate a frequency-domain pilot signal; and To modulate the frequency-domain pilot signal in the time domain.

Preferably the pilot signal modulating module 1001 configured to modulate the frequency-domain pilot signal in the time domain is configured:

To perform frequency domain to time domain conversion on the frequency-domain pilot signal to generate a first time-domain signal, where the first time-domain signal is the modulated pilot signal, and the length of the first time-domain signal is less than the length of an orthogonal frequency division multiplex symbol for data transmission, and no less than half the length of the data portion in the orthogonal frequency division multiplex symbol for data transmission.

Preferably the pilot signal modulating module 1001 configured to perform frequency domain to time domain conversion on the frequency-domain pilot signal to generate the first time-domain signal is configured:

To perform frequency domain to time domain conversion on the frequency-domain pilot signal to generate a second time-domain signal, where both a first half of the second time-domain signal and a second half of the second time-domain signal carry the pilot signal; and To intercept a segment of continuous time-domain signal from the second time-domain signal to generate the first time-domain signal, where the first time-domain signal includes the first half of the second time-domain signal or the second half of the second time-domain signal.

Preferably the pilot signal modulating module 1001 configured to intercept the segment of continuous time-domain signal from the second time-domain signal to generate the first time-domain signal is configured:

To intercept the segment of continuous time-domain signal from the second time-domain signal, and to add a cyclic prefix before the intercepted segment of continuous time-domain signal to generate the first time-domain signal, where the first time-domain signal further includes the cyclic prefix; or To add a cyclic prefix before the second time-domain signal, and to intercept the cyclic prefix, and the segment of continuous time-domain signal starting from the starting position of the second time-domain signal to generate the first time-domain signal, where the first time-domain signal further includes the cyclic prefix.

Preferably the length of the first time-domain signal is the length in the time domain of the first and/or last orthogonal frequency division multiplex symbol of the sub-frame in which the pilot signal is transmitted.

Preferably there is a guard period in the sub-frame, and the sum of the length of the first time-domain signal and the length of the guard period is the length in the time domain of the first and/or last orthogonal frequency division multiplex symbol of the sub-frame in which the pilot signal is transmitted.

Preferably the pilot signal transmitting module 1002 configured to transmit the modulated pilot signal in the first orthogonal frequency division multiplex symbol in the sub-frame is configured:

To transmit the first time-domain signal, which is the modulated pilot signal, in a time domain range from an ending position of the guard period to an ending position of the first orthogonal frequency division multiplex symbol in the sub-frame, where a starting position of the guard period is a starting position of the first orthogonal frequency division multiplex symbol in the sub-frame.

Preferably the pilot signal transmitting module 1002 configured to transmit the modulated pilot signal in the last orthogonal frequency division multiplex symbol in the sub-frame is configured:

To transmit the first time-domain signal, which is the modulated pilot signal, in a time domain range from a starting position of the last orthogonal frequency division multiplex symbol in the sub-frame to a starting position of the guard period, where an ending position of the guard period is an ending position of the last orthogonal frequency division multiplex symbol in the sub-frame.

Preferably the pilot signal modulating module 1001 configured to modulate the frequency-domain pilot signal in the time domain is configured:

To perform frequency domain to time domain conversion on the frequency-domain pilot signal to generate a second time-domain signal, where the second time-domain signal is the modulated pilot signal, and the length of the second time-domain signal is the length in the time domain of the first and/last orthogonal frequency division multiplex symbol in the sub-frame in which the pilot signal is transmitted.

Figure 11:
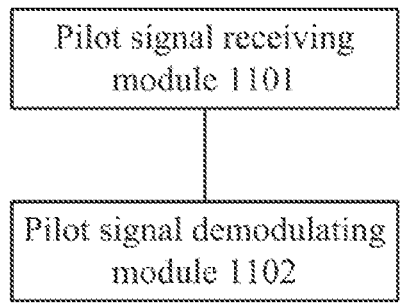
FIG. 11 illustrates a schematic structural diagram of a pilot signal receiver according to an embodiment of the invention.

Based upon the same inventive idea as the method, an embodiment of the invention further provides a pilot signal receiver the structure thereof as illustrated in FIG. 11, which particularly structurally includes:

A pilot signal receiving module 1101 is configured to receive a modulated pilot signal in a first and/or last orthogonal frequency division multiplex symbol of a sub-frame in which the pilot signal is transmitted; and A pilot signal demodulating module 1102 is configured to perform orthogonal frequency division multiplex demodulation on the modulated pilot signal to obtain the pilot signal.

Preferably the pilot signal demodulating module 1102 is configured:

To perform time to frequency conversion on the modulated pilot signal to generate a frequency-domain pilot signal; and To de-map the frequency-domain pilot signal, and to obtain the pilot signal from a set of even sub-carriers; or to de-map the frequency-domain pilot signal, and to obtain the pilot signal from a set of odd sub-carriers.

Preferably the length of the modulated pilot signal is less than the length of an orthogonal frequency division multiplex symbol for data transmission, and no less than half the length of the data portion in the orthogonal frequency division multiplex symbol for data transmission.

Preferably the length of the modulated pilot signal is the length in the time domain of the first and/or last orthogonal frequency division multiplex symbol in the sub-frame in which the pilot signal is transmitted.

Preferably there is a guard period in the sub-frame, and the sum of the length of the modulated pilot signal and the length of the guard period is the length in the time domain of the first and/or last orthogonal frequency division multiplex symbol in the sub-frame in which the pilot signal is transmitted.

Preferably the pilot signal receiving module 1101 configured to receive the modulated pilot signal in the first orthogonal frequency division multiplex symbol of the sub-frame is configured:

To receive the modulated pilot signal in a time domain range from an ending position of the guard period to an ending position of the first orthogonal frequency division multiplex symbol in the sub-frame, where a starting position of the guard period is a starting position of the first orthogonal frequency division multiplex symbol in the sub-frame.

Preferably the pilot signal receiving module 1101 configured to receive the modulated pilot signal in the last orthogonal frequency division multiplex symbol of the sub-frame is configured:

To receive the modulated pilot signal in a time domain range from a starting position of the last orthogonal frequency division multiplex symbol in the sub-frame to a starting position of the guard period, where an ending position of the guard period is an ending position of the last orthogonal frequency division multiplex symbol in the sub-frame.

Preferably the pilot signal receiving module 1101 configured to receive the modulated pilot signal in the first orthogonal frequency division multiplex symbol in the sub-frame is configured:

To receive a modulated pilot signal corresponding to half a second time-domain signal in a time domain range between an ending position of the guard period and an ending position of the first orthogonal frequency division multiplex symbol in the sub-frame, where the modulated pilot signal corresponding to half the second time-domain signal is a channel response signal of a first half or second half of the second time-domain signal, the second time-domain signal is obtained by a transmitter performing frequency domain to time domain conversion on the frequency-domain pilot signal, and both the first half of the second time-domain signal and the second half of the second time-domain signal carry the pilot signal.

Preferably the pilot signal receiving module 1101 configured to receive the modulated pilot signal in the last orthogonal frequency division multiplex symbol in the sub-frame is configured:

To receive a modulated pilot signal corresponding to half a second time-domain signal in a time domain range between a starting position of the last orthogonal frequency division multiplex symbol in the sub-frame and a starting position of the guard period, where the modulated pilot signal corresponding to half the second time-domain signal is a channel response signal of a first half or second half of the second time-domain signal, the second time-domain signal is obtained by a transmitter performing frequency domain to time domain conversion on the frequency-domain pilot signal, and both the first half of the second time-domain signal and the second half of the second time-domain signal carry the pilot signal.

Preferably the length of the modulated pilot signal is the length in the time domain of the first and/or last orthogonal frequency division multiplex symbol in the sub-frame in which the pilot signal is transmitted, which is equal to the length of an orthogonal frequency division multiplex symbol for data transmission.

The structure of and processing by the pilot signal transmitter according to the embodiment of the invention will be described below in connection with a preferred hardware structure thereof.

Figure 12:
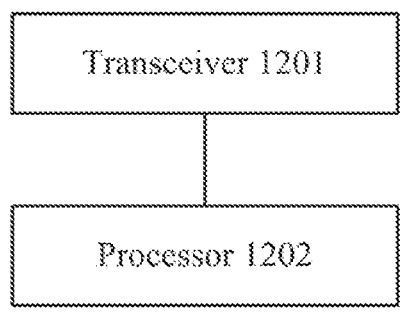
FIG. 12 illustrates a schematic structural diagram of another pilot signal transmitter according to an embodiment of the invention.

As illustrated in FIG. 12, the transmitter includes a transceiver 1201, and at least one processor 1202 connected with the transceiver 1201, where:

The processor 1202 is configured to perform orthogonal frequency division multiplex modulation on a pilot signal; and The transceiver 1201 is configured to transmit the modulated pilot signal in a first and/or last orthogonal frequency division multiplex symbol of a sub-frame in which the pilot signal is transmitted.

Preferably the processor 1202 is configured:

To map the pilot signal to a set of even sub-carriers of the first and/or last orthogonal frequency division multiplex symbol to generate a frequency-domain pilot signal; or to map the pilot signal to a set of odd sub-carriers of the first and/or last orthogonal frequency division multiplex symbol to generate a frequency-domain pilot signal; and To modulate the frequency-domain pilot signal in the time domain.

Preferably the processor 1202 configured to modulate the frequency-domain pilot signal in the time domain is configured to perform frequency domain to time domain conversion on the frequency-domain pilot signal to generate a first time-domain signal, where the first time-domain signal is the modulated pilot signal, and the length of the first time-domain signal is less than the length of an orthogonal frequency division multiplex symbol for data transmission, and no less than half the length of the data portion in the orthogonal frequency division multiplex symbol for data transmission.

Preferably the processor 1202 configured to perform frequency domain to time domain conversion on the frequency-domain pilot signal to generate the first time-domain signal is configured:

To perform frequency domain to time domain conversion on the frequency-domain pilot signal to generate a second time-domain signal so that both a first half of the second time-domain signal and a second half of the second time-domain signal carry the pilot signal; and to intercept a segment of continuous time-domain signal from the second time-domain signal to generate the first time-domain signal, where the first time-domain signal includes the first half of the second time-domain signal or the second half of the second time-domain signal.

Preferably the processor 1202 configured to intercept the segment of continuous time-domain signal from the second time-domain signal to generate the first time-domain signal is configured:

To intercept the segment of continuous time-domain signal from the second time-domain signal, and to add a cyclic prefix before the intercepted segment of continuous time-domain signal to generate the first time-domain signal, where the first time-domain signal further includes the cyclic prefix;

Or

To add a cyclic prefix before the second time-domain signal, and to intercept the cyclic prefix, and the segment of continuous time-domain signal starting from the starting position of the second time-domain signal to generate the first time-domain signal, where the first time-domain signal further includes the cyclic prefix.

Preferably the length of the first time-domain signal is the length in the time domain of the first and/or last orthogonal frequency division multiplex symbol of the sub-frame in which the pilot signal is transmitted.

Preferably there is a guard period in the sub-frame, and the sum of the length of the first time-domain signal and the length of the guard period is the length in the time domain of the first and/or last orthogonal frequency division multiplex symbol of the sub-frame in which the pilot signal is transmitted.

Preferably the transceiver 1201 configured to transmit the modulated pilot signal in the first orthogonal frequency division multiplex symbol in the sub-frame is configured to transmit the first time-domain signal, which is the modulated pilot signal, in a time domain range from an ending position of the guard period to an ending position of the first orthogonal frequency division multiplex symbol in the sub-frame, where a starting position of the guard period is a starting position of the first orthogonal frequency division multiplex symbol in the sub-frame.

Preferably the transceiver 1201 configured to transmit the modulated pilot signal in the last orthogonal frequency division multiplex symbol in the sub-frame is configured to transmit the first time-domain signal, which is the modulated pilot signal, in a time domain range from a starting position of the last orthogonal frequency division multiplex symbol in the sub-frame to a starting position of the guard period, where an ending position of the guard period is an ending position of the last orthogonal frequency division multiplex symbol in the sub-frame.

Preferably the processor 1202 configured to modulate the frequency-domain pilot signal in the time domain is configured to perform frequency domain to time domain conversion on the frequency-domain pilot signal to generate a second time-domain signal, where the second time-domain signal is the modulated pilot signal, and the length of the second time-domain signal is the length in the time domain of the first and/last orthogonal frequency division multiplex symbol in the sub-frame in which the pilot signal is transmitted.

The structure of and processing by the pilot signal receiver according to the embodiment of the invention will be described below in connection with a preferred hardware structure thereof.

Figure 13:
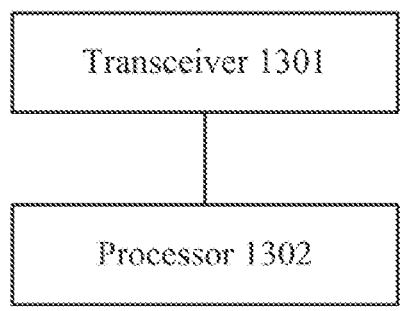
FIG. 13 illustrates a schematic structural diagram of another pilot signal receiver according to an embodiment of the invention.

As illustrated in FIG. 13, the receiver includes a transceiver 1301, and at least one processor 1302 connected with the transceiver 1301, where:

The transceiver 1301 is configured to receive a modulated pilot signal in a first and/or last orthogonal frequency division multiplex symbol of a sub-frame in which the pilot signal is transmitted; and The processor 1302 is configured to perform orthogonal frequency division multiplex demodulation on the modulated pilot signal to obtain the pilot signal.

Preferably the processor 1302 is configured:

To perform time to frequency conversion on the modulated pilot signal to generate a frequency-domain pilot signal; and To de-map the frequency-domain pilot signal, and to obtain the pilot signal from a set of even sub-carriers; or to de-map the frequency-domain pilot signal, and to obtain the pilot signal from a set of odd sub-carriers.

Preferably the length of the modulated pilot signal is less than the length of an orthogonal frequency division multiplex symbol for data transmission, and no less than half the length of the data portion in the orthogonal frequency division multiplex symbol for data transmission.

Preferably the length of the modulated pilot signal is the length in the time domain of the first and/or last orthogonal frequency division multiplex symbol in the sub-frame in which the pilot signal is transmitted.

Preferably there is a guard period in the sub-frame, and the sum of the length of the modulated pilot signal and the length of the guard period is the length in the time domain of the first and/or last orthogonal frequency division multiplex symbol in the sub-frame in which the pilot signal is transmitted.

Preferably the transceiver 1301 configured to receive the modulated pilot signal in the first orthogonal frequency division multiplex symbol of the sub-frame is configured:

To receive the modulated pilot signal in a time domain range from an ending position of the guard period to an ending position of the first orthogonal frequency division multiplex symbol in the sub-frame, where a starting position of the guard period is a starting position of the first orthogonal frequency division multiplex symbol in the sub-frame.

Preferably the transceiver 1301 configured to receive the modulated pilot signal in the last orthogonal frequency division multiplex symbol of the sub-frame is configured:

To receive the modulated pilot signal in a time domain range from a starting position of the last orthogonal frequency division multiplex symbol in the sub-frame to a starting position of the guard period, where an ending position of the guard period is an ending position of the last orthogonal frequency division multiplex symbol in the sub-frame.

Preferably the transceiver 1301 configured to receive the modulated pilot signal in the first orthogonal frequency division multiplex symbol in the sub-frame is configured:

To receive a modulated pilot signal corresponding to half a second time-domain signal in a time domain range between an ending position of the guard period and an ending position of the first orthogonal frequency division multiplex symbol in the sub-frame, where the modulated pilot signal corresponding to half the second time-domain signal is a channel response signal of a first half or second half of the second time-domain signal, the second time-domain signal is obtained by a transmitter performing frequency domain to time domain conversion on the frequency-domain pilot signal, and both the first half of the second time-domain signal and the second half of the second time-domain signal carry the pilot signal.

Preferably the transceiver 1301 configured to receive the modulated pilot signal in the last orthogonal frequency division multiplex symbol in the sub-frame is configured:

To receive a modulated pilot signal corresponding to half a second time-domain signal in a time domain range between a starting position of the last orthogonal frequency division multiplex symbol in the sub-frame and a starting position of the guard period, where the modulated pilot signal corresponding to half the second time-domain signal is a channel response signal of a first half or second half of the second time-domain signal, the second time-domain signal is obtained by a transmitter performing frequency domain to time domain conversion on the frequency-domain pilot signal, and both the first half of the second time-domain signal and the second half of the second time-domain signal carry the pilot signal.

Preferably the length of the modulated pilot signal is the length in the time domain of the first and/or last orthogonal frequency division multiplex symbol in the sub-frame in which the pilot signal is transmitted, which is equal to the length of an orthogonal frequency division multiplex symbol in which data are transmitted.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting a pilot signal, comprising:
mapping the pilot signal to a set of even sub-carriers of a first and/or last orthogonal frequency division multiplex symbol to generate a frequency-domain pilot signal; or mapping the pilot signal to a set of odd sub-carriers of the first and/or last orthogonal frequency division multiplex symbol to generate a frequency-domain pilot signal;
modulating the frequency-domain pilot signal in the time domain; and transmitting the modulated pilot signal in the first and/or last orthogonal frequency division multiplex symbol of a sub-frame in which the pilot signal is transmitted;

wherein modulating the frequency-domain pilot signal in the time domain comprises:

performing frequency domain to time domain conversion on the frequency-domain pilot signal to generate a second time-domain signal, wherein the second time-domain signal has a length of one orthogonal frequency division multiplex symbol, and both a first half of the second time-domain signal and a second half of the second time-domain signal carry the pilot signal; and intercepting a segment of continuous time-domain signal from the second time-domain signal to generate a first time-domain signal, wherein the first time-domain signal comprises the first half of the second time-domain signal or the second half of the second time-domain signal, the first time-domain signal is the modulated pilot signal, and the length of the first time-domain signal is less than the length of an orthogonal frequency division multiplex symbol for data transmission, and no less than half the length of data portion in the orthogonal frequency division multiplex symbol for data transmission.

2. The method according to claim 1, wherein the intercepting the segment of continuous time-domain signal from the second time-domain signal to generate the first time-domain signal comprises:

intercepting the segment of continuous time-domain signal from the second time-domain signal, and adding a cyclic prefix before the intercepted segment of continuous time-domain signal to generate the first time-domain signal, wherein the first time-domain signal further comprises the cyclic prefix; or adding a cyclic prefix before the second time-domain signal, and intercepting the cyclic prefix, and the segment of continuous time-domain signal starting from the starting position of the second time-domain signal to generate the first time-domain signal, wherein the first time-domain signal further comprises the cyclic prefix.

3. The method according to claim 1, wherein the sub-frame comprises a guard period, and the sum of the length of the first time-domain signal and the length of the guard period is the length in the time domain of the first and/or last orthogonal frequency division multiplex symbol of the sub-frame in which the pilot signal is transmitted;

wherein transmitting the modulated pilot signal in the first orthogonal frequency division multiplex symbol in the sub-frame comprises:

transmitting the first time-domain signal in a time domain range from an ending position of the guard period to an ending position of the first orthogonal frequency division multiplex symbol in the sub-frame, wherein a starting position of the guard period is a starting position of the first orthogonal frequency division multiplex symbol in the sub-frame; and/or wherein transmitting the modulated pilot signal in the last orthogonal frequency division multiplex symbol in the sub-frame comprises:

transmitting the first time-domain signal in a time domain range from a starting position of the last orthogonal frequency division multiplex symbol in the sub-frame to a starting position of the guard period, wherein an ending position of the guard period is an ending position of the last orthogonal frequency division multiplex symbol in the sub-frame.

4. The method according to claim 1, wherein modulating the frequency-domain pilot signal in the time domain comprises:

performing frequency domain to time domain conversion on the frequency-domain pilot signal to generate a second time-domain signal, wherein the second time-domain signal is the modulated pilot signal, and the length of the second time-domain signal is the length in the time domain of the first and/last orthogonal frequency division multiplex symbol in the sub-frame in which the pilot signal is transmitted.

5. A method for receiving a pilot signal, the method comprising:

receiving the modulated pilot signal in a first and/or last orthogonal frequency division multiplex symbol of a sub-frame in which the pilot signal is transmitted;

performing time to frequency conversion on the modulated pilot signal to generate a frequency-domain pilot signal; and de-mapping the frequency-domain pilot signal, and obtaining the pilot signal from a set of even sub-carriers; or de-mapping the frequency-domain pilot signal, and obtaining the pilot signal from a set of odd sub-carriers;

wherein the modulated pilot signal is a channel response signal of a first half or a second half of a second time-domain signal, the second time-domain signal is obtained by a transmitter performing frequency domain to time domain conversion on the frequency-domain pilot signal, and the second time-domain signal has a length of one orthogonal frequency division multiplex symbol, both the first half of the second time-domain signal and the second half of the second time-domain signal carry the pilot signal; and wherein the length of the modulated pilot signal is less than the length of an orthogonal frequency division multiplex symbol for data transmission, and no less than half the length of data portion in the orthogonal frequency division multiplex symbol for data transmission; and the length of the modulated pilot signal is the length in the time domain of the first and/or last orthogonal frequency division multiplex symbol in the sub-frame in which the pilot signal is transmitted.

6. The method according to claim 5, wherein the sub-frame comprises a guard period, and the sum of the length of the modulated pilot signal and the length of the guard period is the length in the time domain of the first and/or last orthogonal frequency division multiplex symbol in the sub-frame in which the pilot signal is transmitted;

wherein receiving the modulated pilot signal in the first orthogonal frequency division multiplex symbol of the sub-frame comprises:

receiving the modulated pilot signal in a time domain range from an ending position of the guard period to an ending position of the first orthogonal frequency division multiplex symbol in the sub-frame, wherein a starting position of the guard period is a starting position of the first orthogonal frequency division multiplex symbol in the sub-frame; and/or wherein receiving the modulated pilot signal in the last orthogonal frequency division multiplex symbol of the sub-frame comprises:

receiving the modulated pilot signal in a time domain range from a starting position of the last orthogonal frequency division multiplex symbol in the sub-frame to a starting position of the guard period, wherein an ending position of the guard period is an ending position of the last orthogonal frequency division multiplex symbol in the sub-frame.

7. The method according to claim 6, wherein receiving the modulated pilot signal in the first orthogonal frequency division multiplex symbol in the sub-frame comprises:
receiving the modulated pilot signal in a time domain range between an ending position of the guard period and an ending position of the first orthogonal frequency division multiplex symbol in the sub-frame; and/or
wherein receiving the modulated pilot signal in the last orthogonal frequency division multiplex symbol in the sub-frame comprises:
receiving the modulated pilot signal in a time domain range between a starting position of the last orthogonal frequency division multiplex symbol in the sub-frame and a starting position of the guard period.

8. A pilot signal transmitter, comprising:
a transceiver, and at least one processor connected with the transceiver, wherein:
the processor is configured to map the pilot signal to a set of even sub-carriers of a first and/or last orthogonal frequency division multiplex symbol to generate a frequency-domain pilot signal; or map the pilot signal to a set of odd sub-carriers of the first and/or last orthogonal frequency division multiplex symbol to generate a frequency-domain pilot signal; and modulate the frequency-domain pilot signal in the time domain; and
the transceiver is configured to transmit the modulated pilot signal in the first and/or last orthogonal frequency division multiplex symbol of a sub-frame in which the pilot signal is transmitted;
wherein the processor configured to modulate the frequency-domain pilot signal in the time domain is configured to perform frequency domain to time domain conversion on the frequency-domain pilot signal to generate a second time-domain signal, wherein the second time-domain signal has a length of one orthogonal frequency division multiplex symbol, and both a first half of the second time-domain signal and a second half of the second time-domain signal carry the pilot signal; and intercept a segment of continuous time-domain signal from the second time-domain signal to generate a first time-domain signal, wherein the first time-domain signal comprises the first half of the second time-domain signal or the second half of the second time-domain signal, the first time-domain signal is the modulated pilot signal, and the length of the first time-domain signal is less than the length of an orthogonal frequency division multiplex symbol for data transmission, and no less than half the length of data portion in the orthogonal frequency division multiplex symbol for data transmission.

9. The transmitter according to claim 8, wherein the processor configured to intercept the segment of continuous time-domain signal from the second time-domain signal to generate the first time-domain signal is configured:
to intercept the segment of continuous time-domain signal from the second time-domain signal, and to add a cyclic prefix before the intercepted segment of continuous time-domain signal to generate the first time-domain signal, wherein the first time-domain signal further comprises the cyclic prefix; or
to add a cyclic prefix before the second time-domain signal, and to intercept the cyclic prefix, and the segment of continuous time-domain signal starting from the starting position of second time-domain signal to generate the first time-domain signal, wherein the first time-domain signal further comprises the cyclic prefix.

10. The transmitter according to claim 8, wherein the sub-frame comprises a guard period, and the sum of the length of the first time-domain signal and the length of the guard period is the length in the time domain of the first and/or last orthogonal frequency division multiplex symbol of the sub-frame in which the pilot signal is transmitted;
wherein the transceiver configured to transmit the modulated pilot signal in the first orthogonal frequency division multiplex symbol in the sub-frame is configured: to transmit the first time-domain signal in a time domain range from an ending position of the guard period to an ending position of the first orthogonal frequency division multiplex symbol in the sub-frame, wherein a starting position of the guard period is a starting position of the first orthogonal frequency division multiplex symbol in the sub-frame; and/or
wherein the transceiver configured to transmit the modulated pilot signal in the last orthogonal frequency division multiplex symbol in the sub-frame is configured:
to transmit the first time-domain signal in a time domain range from a starting position of the last orthogonal frequency division multiplex symbol in the sub-frame to a starting position of the guard period, wherein an ending position of the guard period is an ending position of the last orthogonal frequency division multiplex symbol in the sub-frame.

11. The transmitter according to claim 8, wherein the processor configured to modulate the frequency-domain pilot signal in the time domain is configured:
to perform frequency domain to time domain conversion on the frequency-domain pilot signal to generate a second time-domain signal, wherein the second time-domain signal is the modulated pilot signal, and the length of the second time-domain signal is the length in the time domain of the first and/last orthogonal frequency division multiplex symbol in the sub-frame in which the pilot signal is transmitted.

12. A pilot signal receiver, comprising:
a transceiver, and at least one processor connected with the transceiver, wherein:
the transceiver is configured to receive a modulated pilot signal in a first and/or last orthogonal frequency division multiplex symbol of a sub-frame in which the pilot signal is transmitted; and
the processor is configured to perform time to frequency conversion on the modulated pilot signal to generate a frequency-domain pilot signal; and de-map the frequency-domain pilot signal, and obtain the pilot signal from a set of even sub-carriers; or de-mapping the frequency-domain pilot signal, and obtaining the pilot signal from a set of odd sub-carriers;
wherein the modulated pilot signal is a channel response signal of a first half or a second half of a second time-domain signal, the second time-domain signal is obtained by a transmitter performing frequency domain to time domain conversion on the frequency-domain pilot signal, and the second time-domain signal has a length of one orthogonal frequency division multiplex symbol, both the first half of the second time-domain signal and the second half of the second time-domain signal carry the pilot signal; and wherein the length of the modulated pilot signal is less than the length of an orthogonal frequency division multiplex symbol for data transmission, and no less than half the length of data portion in the orthogonal frequency division multiplex symbol for data transmission; and the length of the modulated pilot signal is the length in the time domain of the first and/or last orthogonal frequency division multiplex symbol in the sub-frame in which the pilot signal is transmitted.

13. The receiver according to claim 12, wherein the sub-frame comprises a guard period, and the sum of the length of the modulated pilot signal and the length of the guard period is the length in the time domain of the first and/or last orthogonal frequency division multiplex symbol in the sub-frame in which the pilot signal is transmitted;

wherein the transceiver configured to receive the modulated pilot signal in the first orthogonal frequency division multiplex symbol of the sub-frame is configured: to receive the modulated pilot signal in a time domain range from an ending position of the guard period to an ending position of the first orthogonal frequency division multiplex symbol in the sub-frame, wherein a starting position of the guard period is a starting position of the first orthogonal frequency division multiplex symbol in the sub-frame; and/or the transceiver configured to receive the modulated pilot signal in the last orthogonal frequency division multiplex symbol of the sub-frame is configured: to receive the modulated pilot signal in a time domain range from a starting position of the last orthogonal frequency division multiplex symbol in the sub-frame to a starting position of the guard period, wherein an ending position of the guard period is an ending position of the last orthogonal frequency division multiplex symbol in the sub-frame.

14. The receiver according to claim 13, wherein the transceiver configured to receive the modulated pilot signal in the first orthogonal frequency division multiplex symbol in the sub-frame is configured:

to receive the modulated pilot signal in a time domain range between an ending position of the guard period and an ending position of the first orthogonal frequency division multiplex symbol in the sub-frame; and/or the transceiver configured to receive the modulated pilot signal in the last orthogonal frequency division multiplex symbol in the sub-frame is configured:

to receive the modulated pilot signal in a time domain range between a starting position of the last orthogonal frequency division multiplex symbol in the sub-frame and a starting position of the guard period.

* * * * *